(12) United States Patent
Tsuchiya et al.

(10) Patent No.: US 9,142,361 B2
(45) Date of Patent: Sep. 22, 2015

(54) ELECTRIC STORAGE CELL

(75) Inventors: Takayuki Tsuchiya, Saitama (JP); Shigemi Kobayashi, Higashimatsuyama (JP)

(73) Assignee: UD TRUCKS CORPORATION, Saitama (JP)

( * ) Notice: Subject to any disclaimer, the term of this patent is extended or adjusted under 35 U.S.C. 154(b) by 170 days.

(21) Appl. No.: 13/991,317

(22) PCT Filed: Nov. 28, 2011

(86) PCT No.: PCT/JP2011/077373
§ 371 (c)(1),
(2), (4) Date: Jun. 3, 2013

(87) PCT Pub. No.: WO2012/073885
PCT Pub. Date: Jun. 7, 2012

(65) Prior Publication Data
US 2013/0242463 A1    Sep. 19, 2013

(30) Foreign Application Priority Data

Dec. 3, 2010  (JP) ................ 2010-270412

(51) Int. Cl.
*H01G 9/00* (2006.01)
*H01G 11/78* (2013.01)
*H01G 2/10* (2006.01)
*H01M 2/02* (2006.01)
*H01M 2/30* (2006.01)

(52) U.S. Cl.
CPC ............ *H01G 11/78* (2013.01); *H01G 2/10* (2013.01); *H01M 2/0207* (2013.01); *H01M 2/0212* (2013.01); *H01M 2/0275* (2013.01); *H01M 2/30* (2013.01); *Y02E 60/13* (2013.01)

(58) Field of Classification Search
USPC ......... 361/502, 503–504, 508–512, 516–519, 361/526–528
See application file for complete search history.

(56) References Cited

U.S. PATENT DOCUMENTS

2002/0131232 A1 * 9/2002 Sakata et al. ............... 361/502

FOREIGN PATENT DOCUMENTS

| JP | 2003-257393 A | 9/2003 |
| JP | 2004-055171 A | 2/2004 |
| JP | 2007317481 A | 12/2007 |
| JP | 2008-153607 A | 7/2008 |
| JP | 2010-199472 A | 9/2010 |

OTHER PUBLICATIONS

Office Action issued Jul. 29, 2014, corresponds to Japanese patent application No. 2010-270412.
International Search Report corresponding to PCT/JP2011/077373, dated Feb. 28, 2013.

* cited by examiner

*Primary Examiner* — Nguyen T Ha
(74) *Attorney, Agent, or Firm* — Lowe Hauptman & Ham, LLP

(57) ABSTRACT

An electric storage cell includes a film-like casing configured to house a layered charge collector and electrolyte, and an electrode terminal connected to the charge collector and exposed to an outside of the film-like casing, the electric storage cell being chargeable/dischargeable using the electrode terminal, wherein bending portions of the film-like casing are formed in parallel.

11 Claims, 9 Drawing Sheets

ELECTRIC STORAGE CELL

RELATED APPLICATIONS

The present application is a National Phase of International Application Number PCT/JP2011/077373, filed Nov. 28, 2011, and claims priority from Japanese Application Number 2010-270412, filed Dec. 3, 2010.

TECHNICAL FIELD

This invention relates to a chargeable/dischargeable electric storage cell.

BACKGROUND ART

An electric storage cell having a casing made of a thin-film material such as a laminate film has excellent space efficiency and heat radiation. Therefore, such an electric storage cell is used in a secondary battery such as a lithium ion battery as well as an electric double layer capacitor.

In such a kind of the electric storage cell, the casing is formed, typically, through a press work. Therefore, as seen in a focal manner, portions subjected to a strong tensile or bending strain are distributed in places. Such portions are susceptible to a wrinkle or a crack causing liquid leakage.

JP2004-55171A discloses a reinforcing member provided in a corner of an inner surface of a concave portion of the film exterior.

SUMMARY OF THE INVENTION

In the technique disclosed in JP2004-55171A, a crack is prevented using the reinforcing member for the purpose of stress relaxation. However, the method of using the reinforcing member fails to perfectly prevent a crack, and it is difficult to prevent liquid leakage unless the reinforcing member and the film closely abut on each other.

This invention has been designed in consideration of these problems, and an object thereof is to provide a film-like casing capable of preventing liquid leakage.

According to one aspect of this invention, an electric storage cell including a film-like casing configured to house a layered charge collector and electrolyte, and an electrode terminal connected to the charge collector and exposed to an outside of the film-like casing is provided. The electric storage cell is chargeable/dischargeable using the electrode terminal, wherein bending portions of the film-like casing are formed in parallel.

Embodiments of the present invention and advantages thereof are described in detail below with reference to the accompanying drawings.

EMBODIMENTS OF THE INVENTION

Hereinafter, an electric storage cell according to an embodiment of the present invention will be described with reference to the accompanying drawings.

The electric storage cell is chargeable/dischargeable, and includes a secondary battery such as a nickel hydrogen battery or a lithium ion battery as well as an electric double layer capacitor. In the following description of the embodiments, it is assumed that the electric storage cell is an electric double layer capacitor (hereinafter, simply referred to as a "capacitor").

Hereinafter, the capacitor 100 will be described with reference to FIGS. 1 to 5.

Figure 1A:
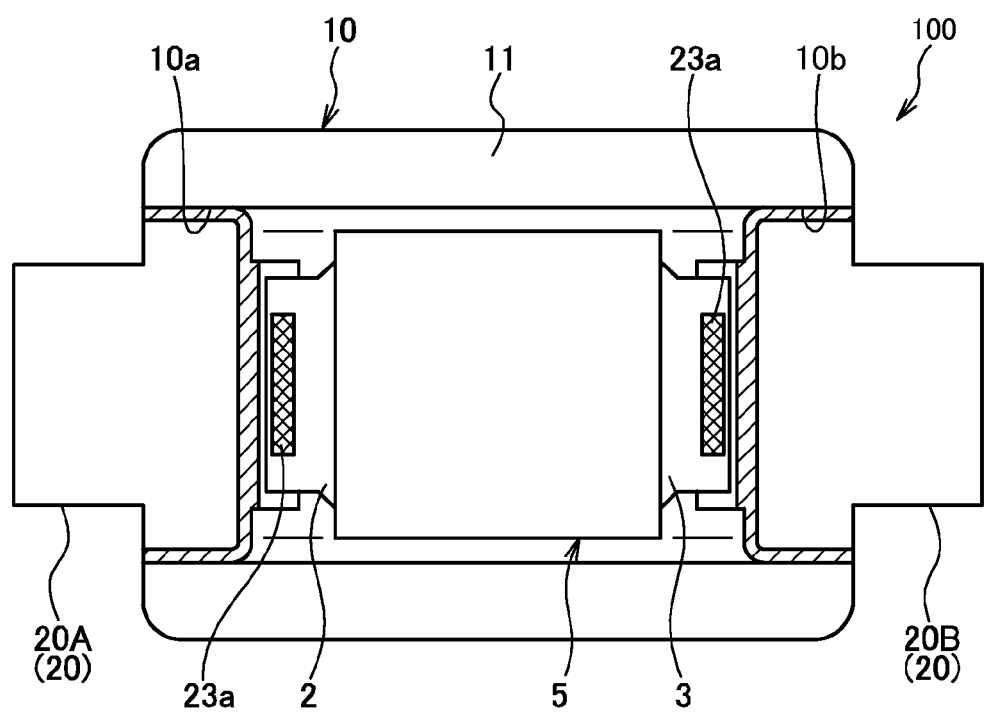
FIG. 1A is a cross-sectional view illustrating a front side of an electric double layer capacitor according to an embodiment of the present invention.
Figure 1B:
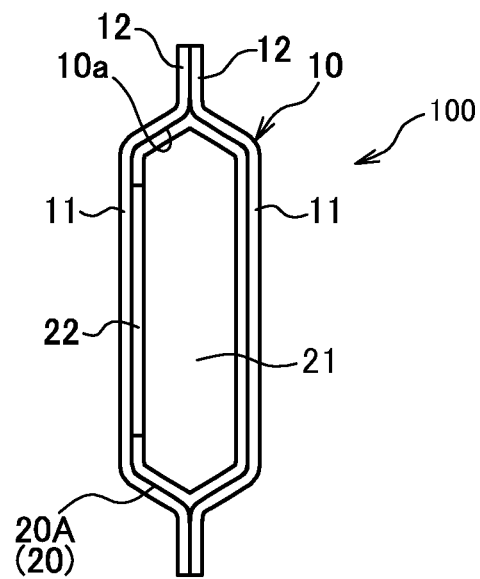
FIG. 1B is a left side view illustrating the electric double layer capacitor of FIG. 1A.
Figure 1C:
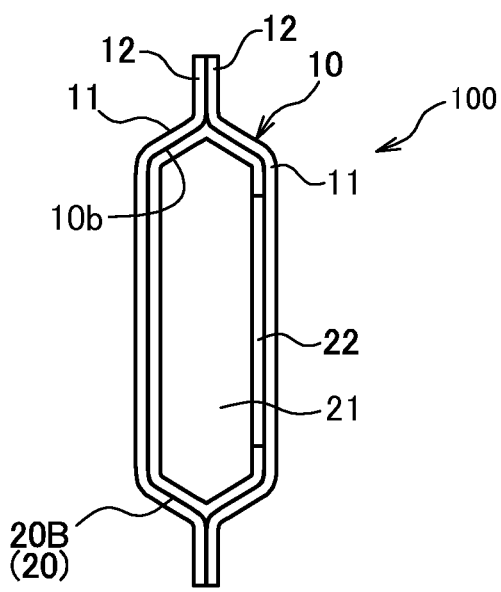
FIG. 1C is a right side view illustrating the electric double layer capacitor of FIG. 1A.

As illustrated in FIG. 1, the capacitor 100 includes a film-like casing 10 having openings 10a and 10b in both ends and a pair of electrode terminals 20 configured to block the openings 10a and 10b of the film-like casing 10 and exposed to the outside of the film-like casing 10.

A layered product 5 is housed in the film-like casing 10. The layered product 5 is obtained by laminating a predetermined number of layers including a positive charge collector 2, a negative charge collector 3, and a separator (not illustrated) interposed between the positive and negative charge collectors 2 and 3 to separate both of them. In addition, electrolyte is hermetically encapsulated in the film-like casing 10. In this manner, the film-like casing 10 houses the layered product 5 and the electrolyte.

The separator hinders a contact between the positive and negative charge collectors 2 and 3, but does not obstruct circulation of ions. The separator is a sheet made of paper or resin. Activated carbons constituting an electric double layer are coated on surfaces of the positive and negative charge collectors 2 and 3.

The capacitor 100 stores electric charges and discharges the stored electric charges using the electrostatic capacity of the electric double layer in both the positive and negative charge collectors 2 and 3. The charge/discharge operation is performed using the electrode terminals 20.

Figure 2:
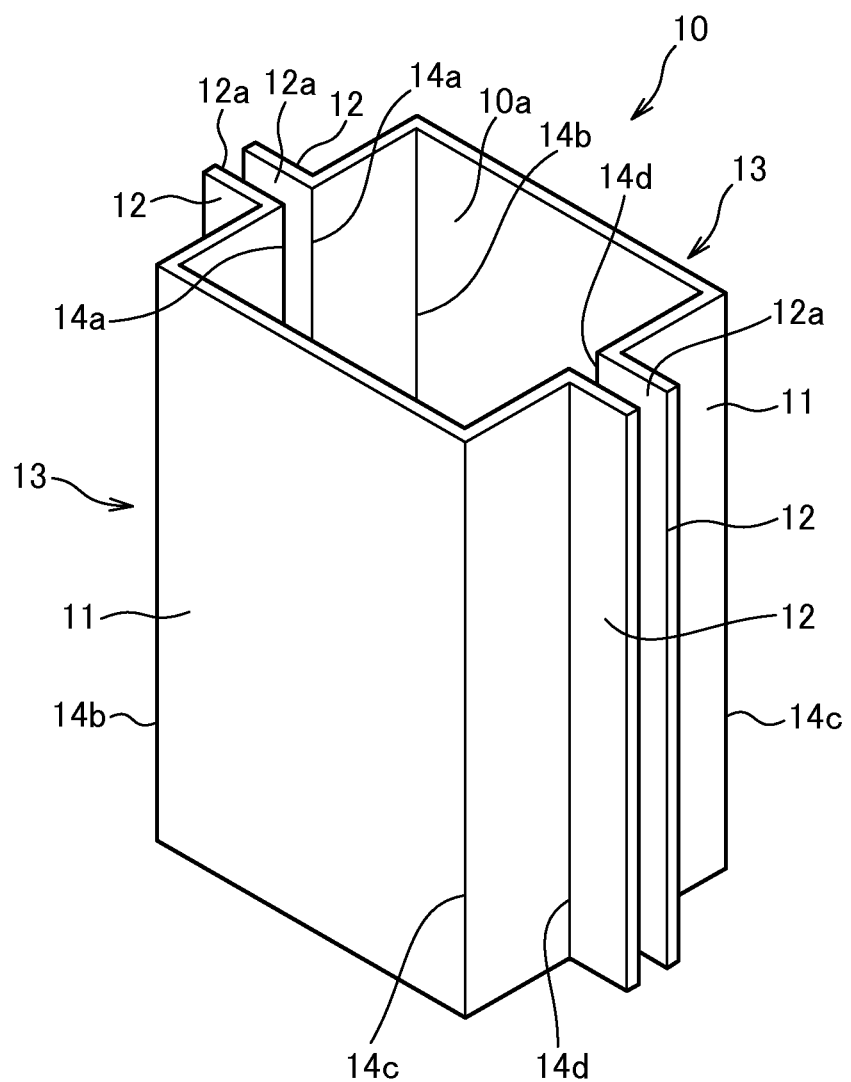
FIG. 2 is an exploded perspective view illustrating a film-like casing.

Next, the film-like casing 10 will be described with reference to FIG. 2.

The film-like casing 10 is formed by facing a pair of frames 13 to each other and bonding a surface 12a of a flange 12 to the other one. Each frame 13 includes a main body 11 configured to house the layered product 5 and have an approximately U-shaped cross section and the flange 12 extending to the outside approximately perpendicularly from both ends of the main body 11. As a result, openings 10a and 10b are formed in both ends of the film-like casing 10. FIG. 2 is an exploded perspective view illustrating the film-like casing 10 before a pair of frames 13 are bonded.

Each frame 13 is formed by bending a laminate film sheet. As the main body 11 and the flange 12 are formed by bending the laminate film sheet, four straight bending portions 14a to 14*d* are formed in the frame 13. The four bending portions 14*a* to 14*d* are formed in parallel each other. In this manner, overall bending portions 14*a* to 14*d* formed in the frame 13 are formed in parallel. Therefore, the cross-sectional area of the internal space of the film-like casing 10 is uniform along a longitudinal direction, and the area of the openings 10*a* and 10*b* in both ends are equal to the cross-sectional area of the space where the layered product 5 is housed.

The laminate film is a multi-layered film material obtained by laminating a resin layer on a metal layer such as a metal foil. At least one surface layer of the laminate film is formed of thermoplastic resin. A pair of frames 13 are bonded by facing the thermoplastic resin on the surface layer of the flange 12 to the other one and thermally welding the thermoplastic resin. The sheet is not limited to the laminate film. Instead, the sheet may include a resin sheet or a metal sheet if it has a film shape.

Figure 3:
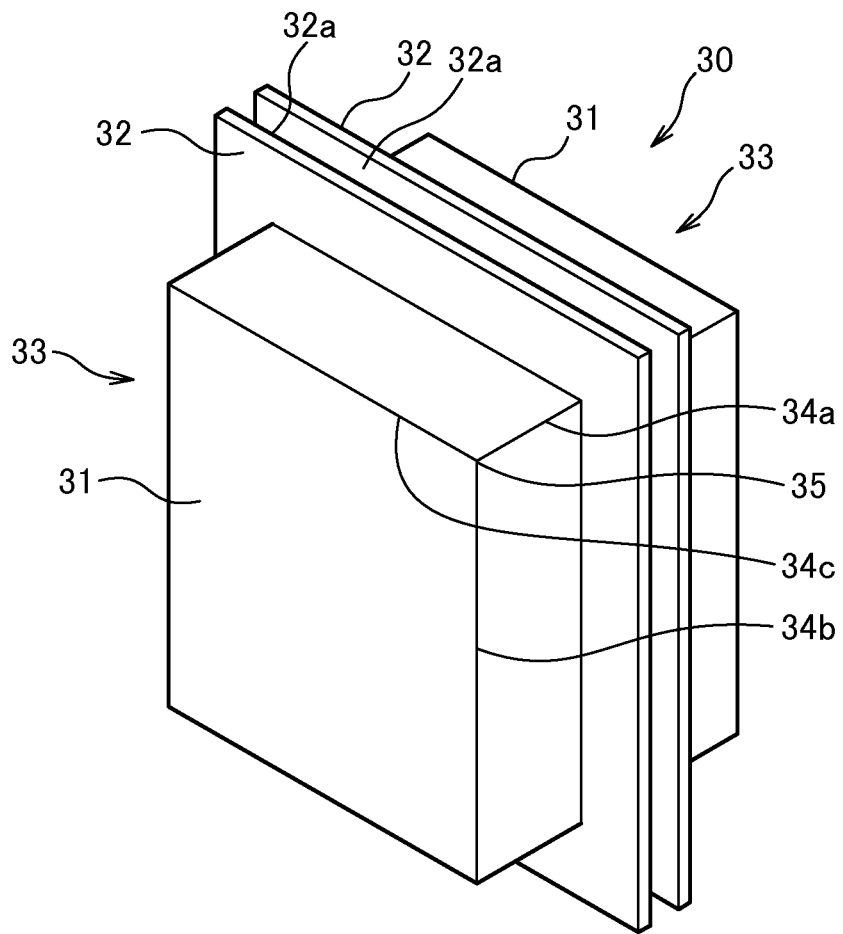
FIG. 3 is an exploded perspective view illustrating a film-like casing in prior art.

FIG. 3 illustrates a film-like casing 30 in prior art as a comparison example. The film-like casing 30 is formed by facing a pair of frames 33 and bonding a surface 32*a* of a flange 32 to the other one. Each frame 33 includes a box-like main body 31 and the flange 32 extending approximately perpendicularly from the opening edge of the main body 31 to the outside. FIG. 3 is an exploded perspective view illustrating the film-like casing 30 before a pair of frames 33 are bonded.

Each frame 33 is formed by performing a press work for the laminate film sheet. In the film-like casing 30 formed in this way, bending portions are not formed in parallel each other. Therefore, for example, a corner 35 is shaped by three bending portions 34*a*, 34*b*, and 34*c* extending to different directions. That is, the corner 35 is shaped through bending along three-axis directions and is subjected to plastic deformation caused by a three-dimensional stress. For this reason, each layer of the laminate film is thinned in the corner 35, and a crack may be easily generated in the corner 35. In particular, a metal layer of the laminate film easily loses tenacity through work hardening by plastic deformation and easily generates a defect causing a crack.

Figure 4:
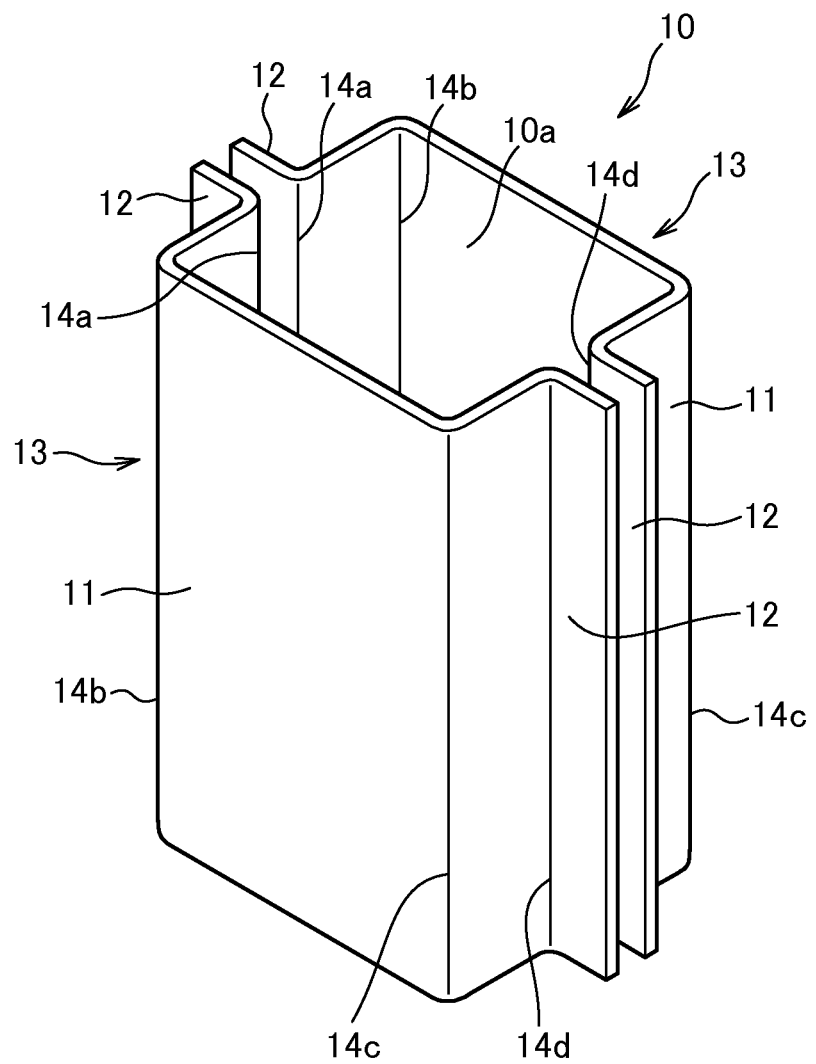
FIG. 4 is an exploded perspective view illustrating a film-like casing.

In contrast, in the film-like casing 10 according to the present embodiment, overall bending portions 14*a* to 14*d* are shaped through bending along a single axis direction. Therefore, no corner exists, and only a simple bending shape exists. The bending portions 14*a* to 14*d* are subjected to a small plastic deformation force and do not easily generate a defect causing a crack. Furthermore, if the bending portions 14*a* to 14*d* are rounded as illustrated in FIG. 4, the plastic deformation force is further reduced. As a result, it is possible to maintain the thicknesses of the bending portions 14*a* to 14*d* as those of other portions, and a defect causing a crack is not easily generated.

Figure 5:
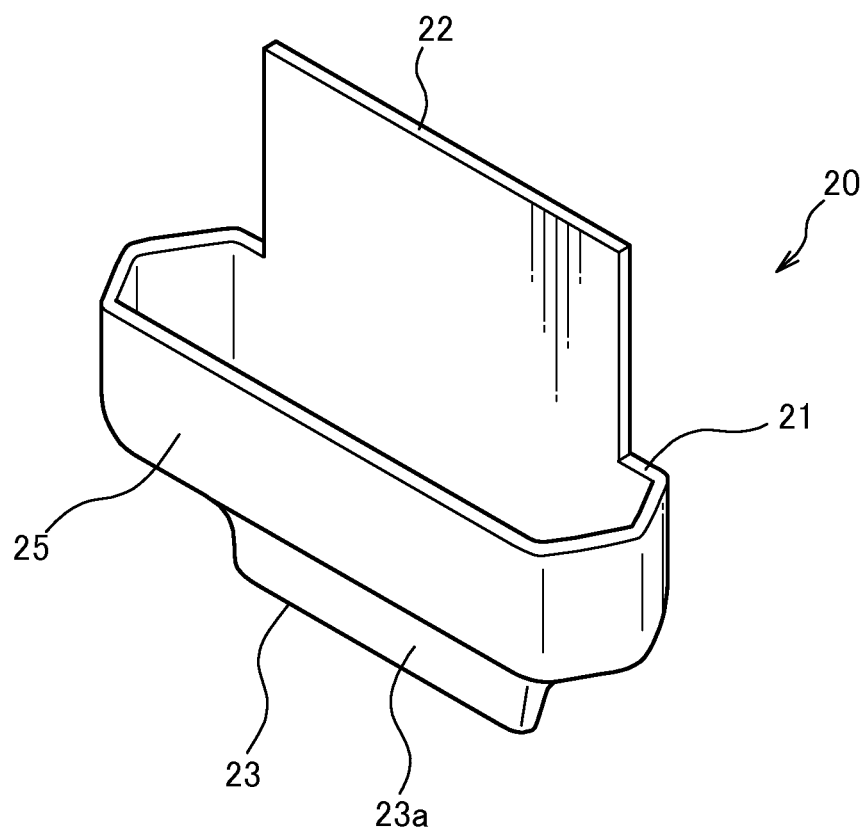
FIG. 5 is a perspective view illustrating an electrode terminal.

Next, the electrode terminal 20 provided in the openings 10*a* and 10*b* of the film-like casing 10 will be described with reference to FIG. 5.

The electrode terminal 20 includes a positive electrode terminal 20A electrically connected to the positive charge collector 2 and a negative electrode terminal 20B electrically connected to the negative charge collector 3. The positive electrode terminal 20A is provided to block one opening 10*a* of the film-like casing 10, and the negative electrode terminal 20B is provided to block the other opening 10*b*. The positive and negative electrode terminals 20A and 20B have the same shape. Therefore, in the following description, only the positive electrode terminal 20A will be described.

The positive electrode terminal 20A is made of a conductive metal such as aluminum. The positive electrode terminal 20A includes a main body 21 formed in a cup-like shape and bonded to the inner circumference of the opening 10*a*, an external terminal portion 22 extending from the main body 21 and extracted to the outside of the film-like casing 10, and a charge collector connecting portion 23 protruding from the bottom of the main body 21 and connected to the positive charge collector 2. The charge collector connecting portion 23 of the negative electrode terminal 20B is connected to the negative charge collector 3.

The main body 21 is formed in a bottomed cup shape having an approximately elliptical opening and a depth. The main body 21 has a sealing surface 25 formed across the entire outer circumference thereof. Thermoplastic resin is applied to the sealing surface 25 with a uniform thickness. The main body 21 is bonded to the inner circumference of the opening 10*a* of the film-like casing 10 using the thermoplastic resin. In this manner, the entire outer circumference of the main body 21 is bonded to the entire inner circumference of the opening 10*a* of the film-like casing 10. The thermoplastic resin of the sealing surface 25 may be the same type as that of the thermoplastic resin of the surface layer of the laminate film. In this configuration, it is possible to facilitate the thermal welding, so that sealing performance between the outer circumference of the main body 21 and the inner circumference of the opening 10*a* is improved. Alternatively, without providing the thermoplastic resin on the sealing surface 25, the outer circumference of the main body 21 may be directly bonded to the inner circumference of the opening 10*a* using the thermoplastic resin as the surface layer of the laminate film.

In general, the capacitor radiates the heat inside the casing through the electrode terminal. The heat radiation amount of the capacitor is small, compared to a chemical battery which uses a chemical reaction. However, it is necessary to discharge the heat generated in the casing to the outside. Since each electrode terminal 20 is shaped to block the openings 10*a* and 10*b* of the film-like casing 10, the electrode terminal 20 is formed to have the same size as the area of the opening 10*a* or 10*b*. Therefore, in the capacitor 100, it is possible to facilitate external heat exchange using the electrode terminal 20 and efficiently discharge the heat in the film-like casing 10 to the outside.

The external terminal portion 22 is formed in a rectangular flat plate shape. The external terminal portion 22 is extracted to the outside of the film-like casing 10 and connected to an external terminal portion 22 of another neighboring capacitor 100.

The charge collector connecting portion 23 is formed in the opposite side of the external terminal portion 22 by interposing the main body 21. The charge collector connecting portion 23 protrudes to the inside of the film-like casing 10, and the positive charge collector 2 is connected to a flat connecting surface 23*a*. The negative charge collector 3 is connected to the connecting surface 23*a* of the charge collector connecting portion 23 of the negative electrode terminal 20B.

According to the embodiments described above, it is possible to obtain the following effects.

Since the bending portions 14*a* to 14*d* of the film-like casing 10 are formed in parallel, no corner exists in the film-like casing 10, and only a simple bending shape exists. Since the bending portions 14*a* to 14*d* are subjected to a small plastic deformation force, a defect causing a crack is not easily generated. Therefore, it is possible to prevent liquid leakage from the film-like casing 10, improve reliability of the capacitor 100, and lengthen a service life.

Figure 6A:
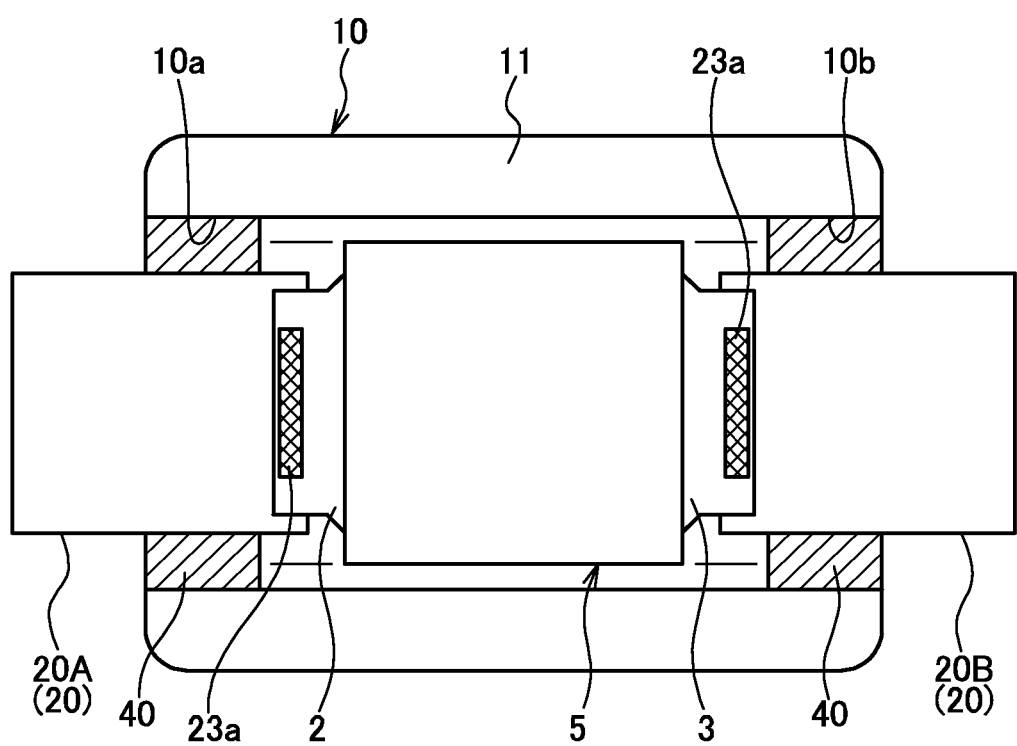
FIG. 6A is a cross-sectional view illustrating a front side of an electric double layer capacitor according to another embodiment of the present invention.
Figure 6B:
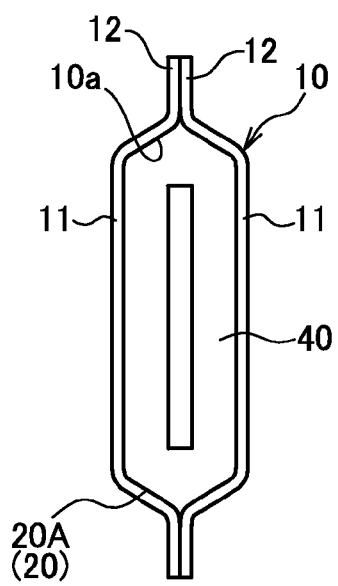
FIG. 6B is a left side view illustrating the electric double layer capacitor of FIG. 6A.
Figure 6C:
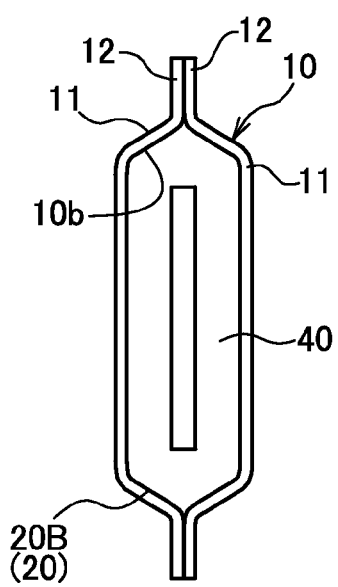
FIG. 6C is a right side view illustrating the electric double layer capacitor of FIG. 6A.

Next, another embodiment of the present invention will be described with reference to FIG. 6. In the embodiment described above, the electrode terminal 20 is shaped to block the openings 10a and 10b of the film-like casing 10. In contrast, in the embodiment illustrated in FIG. 6, the electrode terminal 20 is made of a conductive plate material such as an aluminum plate. The openings 10a and 10b are blocked by the thermoplastic resin 40, and the electrode terminal 20 is fixed using the thermoplastic resin 40.

Figure 7:
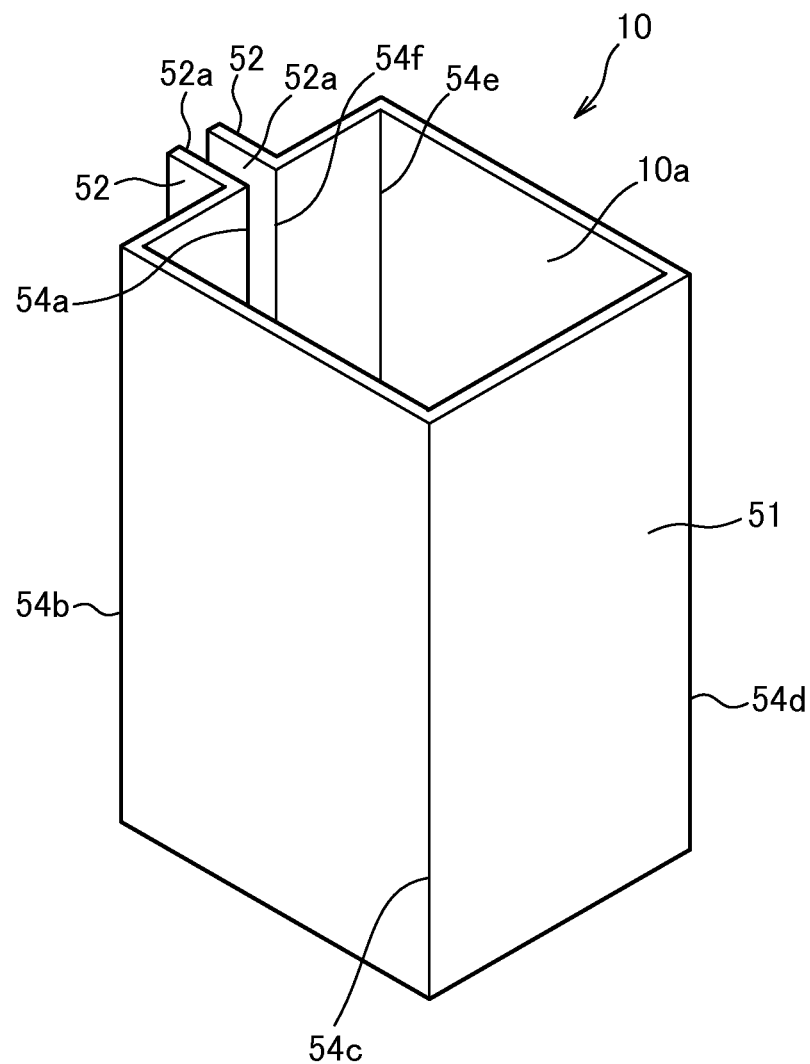
FIG. 7 is a perspective view illustrating a film-like casing.

Next, still another embodiment of the present invention will be described with reference to FIG. 7. In the embodiment described above, the film-like casing 10 is configured by bonding a pair of frames 13 formed by bending a laminate film sheet. In contrast, in the embodiment illustrated in FIG. 7, the film-like casing 10 is configured by bending a single laminate film sheet and bonding both ends of the sheet.

The film-like casing 10 includes a main body 51 having an approximately rectangular cross section to house the layered product 5 and a pair of opposite flanges 52 formed by bending both ends of the laminate film sheet, so that the opposite surfaces 52a of the flanges 52 are bonded to each other. Specifically, opposite surfaces 52a of the flanges 52 are bonded by facing the thermoplastic resin layer as a surface layer of the flange 52 to the other one and thermally welding the thermoplastic resin. As a result, the openings 10a and 10b are formed in both ends of the film-like casing 10. FIG. 7 illustrates the film-like casing 10 before the flanges 52 are bonded.

In the film-like casing 10, six straight bending portions 54a to 54f are formed. The six bending portions 54a to 54f are formed in parallel. In this manner, overall bending portions 54a to 54f formed in the film-like casing 10 are formed in parallel. Therefore, the cross-sectional area of the internal space of the film-like casing 10 is uniform along a longitudinal direction, and the area of the opening 10a and 10b is equal to the cross-sectional area of the space where the layered product 5 is housed.

The film-like casing 10 is formed by bending a single laminate film sheet, and the thermal welding is applied only to a single portion. Therefore, it is possible to more effectively prevent liquid leakage from the film-like casing 10.

This invention is not limited to the embodiment described above, and may be subjected to various modifications within the scope of the technical spirit thereof.

With respect to the above description, the contents of application No. 2010-270412, with a filing date of Dec. 3, 2010 in Japan, are incorporated herein by reference.

The invention claimed is:

1. An electric storage cell, comprising:
   a film-like casing configured to house a layered charge collector and electrolyte; and
   an electrode terminal connected to the charge collector and exposed to an outside of the film-like casing,
   the electric storage cell being chargeable/dischargeable using the electrode terminal,
   wherein overall bending portions of the film-like casing are formed in parallel.

2. The electric storage cell according to claim 1,
   wherein a cross-sectional area of an internal space of the film-like casing is uniform along a longitudinal direction.

3. The electric storage cell according to claim 1,
   wherein the film-like casing has a pair of frames bonded to each other, and the pair of frames are formed by bending a film-like sheet.

4. The electric storage cell according to claim 3,
   wherein the frame has a main body having an approximately U-shaped cross section, and a flange extending to an outside from both ends of the main body, and the film-like casing is configured by facing the pair of frames and bonding a surface of the flange to the other one.

5. The electric storage cell according to claim 1,
   wherein the film-like casing is formed by bending a single film-like sheet and bonding both ends of the sheet.

6. The electric storage cell according to claim 5,
   wherein the film-like casing has a main body having an approximately rectangular cross section and a pair of opposite flanges formed by bending both ends of the sheet, and the film-like casing is configured by bonding opposite surfaces of the flanges to each other.

7. The electric storage cell according to claim 1,
   wherein the bending portions are rounded.

8. The electric storage cell according to claim 1,
   wherein an overall outer circumference of the electrode terminal is bonded to an overall inner circumference of an opening of an end of the film-like casing.

9. The electric storage cell according to claim 1,
   wherein all bending portions of the film-like casing are parallel to each other.

10. An electric storage cell, comprising:
    a film-like casing configured to house a layered charge collector and electrolyte; and
    an electrode terminal connected to the charge collector and exposed to an outside of the film-like casing,
    the electric storage cell being chargeable/dischargeable using the electrode terminal,
    wherein bending portions of the film-like casing are formed in parallel,
    wherein the film-like casing has a pair of frames bonded to each other, and the pair of frames are formed by bending a film-like sheet, and
    wherein the frame has a main body having an approximately U-shaped cross section, and a flange extending to an outside from both ends of the main body, and the film-like casing is configured by facing the pair of frames and bonding a surface of the flange to the other one.

11. An electric storage cell, comprising:
    a film-like casing configured to house a layered charge collector and electrolyte; and
    an electrode terminal connected to the charge collector and exposed to an outside of the film-like casing,
    the electric storage cell being chargeable/dischargeable using the electrode terminal,
    wherein bending portions of the film-like casing are formed in parallel, and
    wherein an overall outer circumference of the electrode terminal is bonded to an overall inner circumference of an opening of an end of the film-like casing.

* * * * *